Oct. 24, 1967     I. SWIECICKI     3,348,806
SPOILERS FOR TURBINE BLADES
Filed March 17, 1967
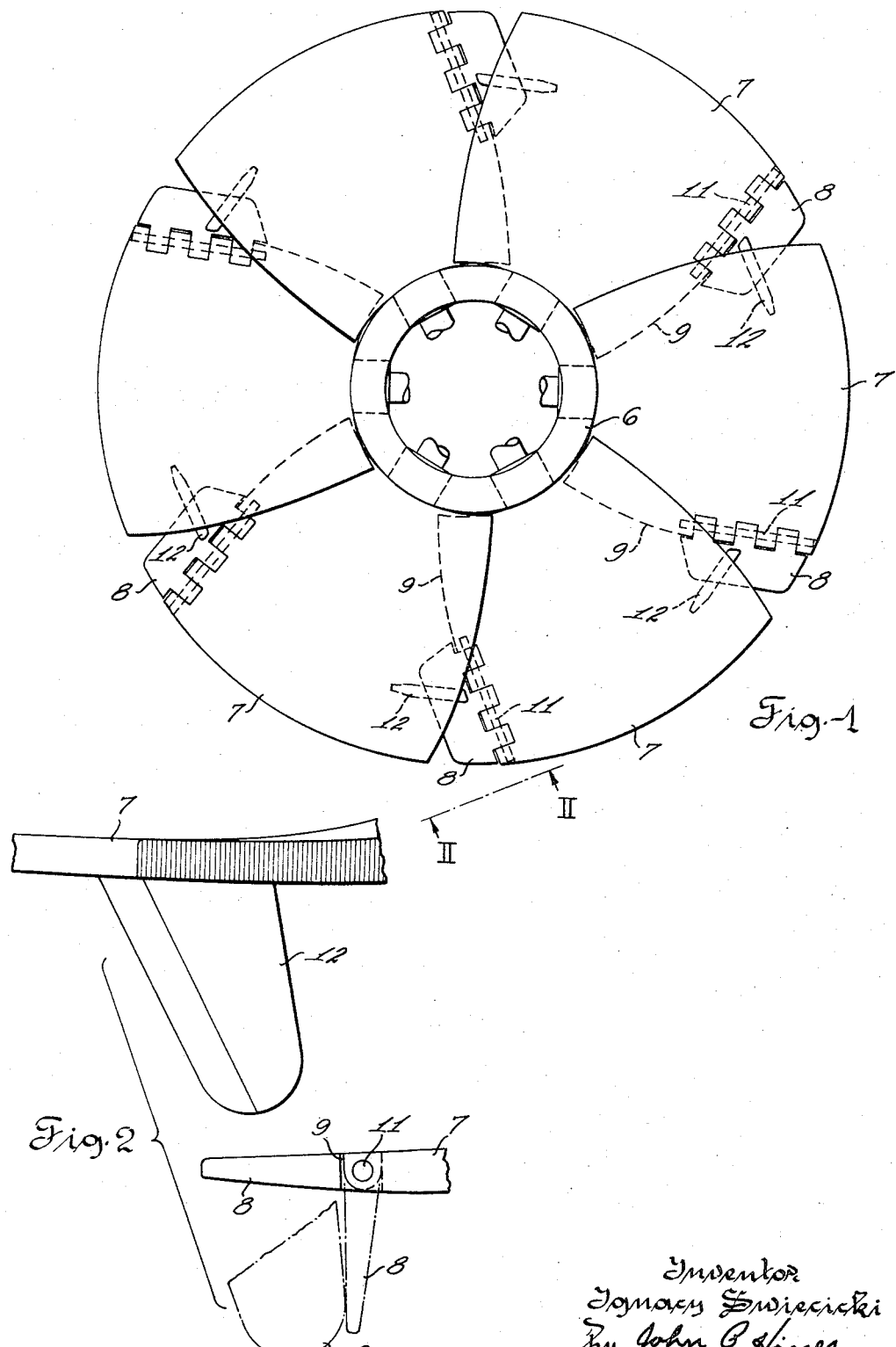

United States Patent Office 3,348,806
Patented Oct. 24, 1967

1

3,348,806
SPOILERS FOR TURBINE BLADES
Ignacy Swiecicki, York, Pa., assignor to Allis-Chalmers Manufacturing Company, Milwaukee, Wis.
Filed Mar. 17, 1967, Ser. No. 623,977
2 Claims. (Cl. 253—59)

ABSTRACT OF THE DISCLOSURE

A device attached to the blades of a hydraulic turbine runner which is forcefully moved into a position to reduce the rotational speed of the turbine runner when the load on the turbine generator has been removed.

This invention pertains in general to hydraulic turbines and more specifically to a means for slowing down the rotational speed of the turbine runner under no-load conditions.

One of the ever present problems in hydraulic turbine installations is to obtain synchronous speed of the generator so that the system load can be applied. A somewhat unique problem exists when the turbine runner and generator are spinning at a speed above synchronous speed under no-load condition. This may occur in a propeller type hydraulic turbine with the adjustable blades where blades overlap one another so that it is impossible to rotate blades to completely flat position. If the blades are not such as to completely flatten and there is no load on the system, with the water passing through the turbine blades it is quite apt to spin the generator at a speed above the synchronous speed of the system.

If the turbine installation is equipped with wicket gates, the water flow can be decreased to a point that synchronous speed is obtained. However, in some installations wicket gates add considerably to the cost of the turbine and therefore other less expensive means of decreasing the no-load speed of the turbine is desirable.

It is therefore a general object of the subject invention to provide an inexpensive and simplified means of insuring that the turbine runner and attached generator do not rotate at a speed above synchronous speed in the no-load condition.

A more specific object of the subject invention is to provide flaps or spoilers on the turbine blade which are forced into a position to resist the rotation of the turbine runner when the blades are in the closed position.

These and other objects of the subject invention will become more fully apparent as the following description is read in light of the attached drawing wherein:

FIG. 1 is a plan view of a hydraulic turbine runner constructed in accordance with the invention; and FIG. 2 is a partial view taken along the lines II—II in FIG. 1.

Referring to the application drawing, FIG. 1 shows a hydraulic turbine runner having a central hub generally designated 6. A plurality of radially extending blades 7 are pivotally connected to this hub in any conventional and well known manner. These blades may be provided with any well known means of adjusting the blades to an open or closed position. As an example, such a mechanism for adjusting the blades is disclosed in U.S. Patent 2,145,805 issued to Joseph J. Ring, Jan. 31, 1939.

When the blades are in the closed position, adjacent blades overlap one another. Since the blades are thicker at their base and because of their configuration, a space does exist between the portions of adjacent blades. With no load on the system, water passing between the blades frequently causes the runner and attached generator to spin at a speed above the synchronous speed of the generator. Although this does not result in any harm to the generator and runner, if the speed is above the synchronous speed, means must be provided to reduce this speed before a load can be applied to the system.

To this end, applicant has provided a spoiler or flap 8 herein shown as attached to the trailing edge 9 of each individual runner blade. These spoilers may be attached to the blade in any manner to permit pivotal movement and are herein shown as hinged to the blades by means of a pin 11.

In order to forcibly hold these spoilers in a position to reduce the rotational speed of the runner, a flange 12 is connected to the leading edge of the adjacent runner blade. This flange contacts the spoiler 8 as the blades are closing and forces it into the position shown in FIG. 2 in phantom lines. In this position the spoilers create a drag on the runner thereby slowing down the rotational speed of the runner.

In the open position, the flange 12 does not contact the spoilers 8 so that the turbine runner may operate in the usual manner. The configuration of the spoiler is such that due to the hydraulic forces imposed on the turbine blades, the spoilers will not interfere with the hydraulic characteristics of the runner.

By properly designing the angle and surface area of the spoilers for a particular turbine runner and installation, the no-load speed of the runner can be reduced to a point to permit applying a load to the generator without exposing the system to excessive electrical shock. With this arrangement, the rotational speed of the turbine runner can be maintained at or near synchronous speed to permit application of the load to the generator.

Although only one embodiment of the subject invention has been herein shown and described, other embodiments will be obvious to those skilled in the art after reading this description and it is intended that all such embodiments as come within a reasonable interpretation of the appended claims be covered.

The embodiments of the invention in which an exclusive property or privilege is claimed are defined as follows:

1. A hydraulic machine motor comprising: a hub, a plurality of blades, having leading and trailing edges, pivotally mounted on said hub and extending outwardly therefrom, said blades being movable from an open position to a closed position; a spoiler pivotally connected to a blade and movable between a first position in the plane of said blade to a second position defining a plane at an angle with the plane of said blade; and means attached to a blade adjacent to said spoiler and engaging said spoiler when said blades are in a closed position to move said spoiler to said second position.

2. The hydraulic machine rotor set forth in claim 1 wherein said spoiler is connected to the trailing edge of said blade.

References Cited

UNITED STATES PATENTS

| 2,284,295 | 5/1942 | Moody | 253—143 X |
| 2,382,108 | 8/1945 | Seewer | 253—143 |
| 2,917,227 | 12/1959 | Ruegsegger | 230—114 |

FOREIGN PATENTS

| 661,671 | 6/1938 | Germany. |

MARTIN P. SCHWADRON, *Primary Examiner.*
EVERETTE A. POWELL, JR., *Examiner.*